(12) United States Patent
Walker

(10) Patent No.: US 9,591,250 B2
(45) Date of Patent: Mar. 7, 2017

(54) REMOTE CONTROL WITH FEEDBACK FOR BLIND NAVIGATION

(75) Inventor: Mark Leroy Walker, Castaic, CA (US)

(73) Assignee: THOMSON LICENSING, Issy de Moulineaux (FR)

(*) Notice: Subject to any disclaimer, the term of this patent is extended or adjusted under 35 U.S.C. 154(b) by 0 days.

(21) Appl. No.: 14/349,709

(22) PCT Filed: Oct. 19, 2011

(86) PCT No.: PCT/US2011/056836
§ 371 (c)(1),
(2), (4) Date: Apr. 4, 2014

(87) PCT Pub. No.: WO2013/058748
PCT Pub. Date: Apr. 25, 2013

(65) Prior Publication Data
US 2014/0232944 A1    Aug. 21, 2014

(51) Int. Cl.
*H04N 5/44* (2011.01)
*H04N 21/422* (2011.01)
*H04N 21/431* (2011.01)

(52) U.S. Cl.
CPC ..... *H04N 5/4403* (2013.01); *H04N 21/42204* (2013.01); *H04N 21/42206* (2013.01); *H04N 21/4312* (2013.01); *H04N 2005/4405* (2013.01)

(58) Field of Classification Search
CPC ....... H01H 2217/032; H01H 2231/032; H01H 2231/036; G06F 3/016; G06F 3/04895; G06F 3/0202; G06F 3/0219; G06F 3/0213; G06F 3/0488; G06F 3/04883; H04N 5/4403; H04N 5/44582

USPC ........ 348/734, 569; 340/12.22, 12.29, 12.54, 340/12.55, 13.21, 13.31, 13.32; 345/156–158, 169
See application file for complete search history.

(56) References Cited

U.S. PATENT DOCUMENTS

| | | | |
|---|---|---|---|
| 5,311,175 A * | 5/1994 | Waldman | 341/34 |
| 5,635,958 A * | 6/1997 | Murai et al. | 345/168 |
| 5,691,878 A | 11/1997 | Ahn et al. | |
| 6,215,417 B1 * | 4/2001 | Krass et al. | 341/20 |
| 6,223,815 B1 | 5/2001 | Shibasaki | |
| 6,317,325 B1 | 11/2001 | Patel et al. | |
| 6,574,083 B1 * | 6/2003 | Krass | G06F 3/0489 341/176 |
| 6,680,677 B1 * | 1/2004 | Tiphane | G06F 3/021 341/22 |

(Continued)

FOREIGN PATENT DOCUMENTS

| | | |
|---|---|---|
| CN | 1826046 | 8/2006 |
| CN | 1917755 | 2/2007 |

(Continued)

*Primary Examiner* — Michael Lee
(74) *Attorney, Agent, or Firm* — Brian J. Dorini; Jerome G. Schaefer

(57) ABSTRACT

A user is provided with an indication of a button's functionality on a viewing device before the button is actually selected. The user receives haptic/tactile feedback to let the user know that they are about to select a button and that its functionality indicator is shown on the viewing device. Thus, the haptic or tactile feedback in combination with on-screen display elements is utilized in a remote control device to eliminate the need for shifting focus away from a viewing device.

10 Claims, 3 Drawing Sheets

(56) References Cited

U.S. PATENT DOCUMENTS

| | | |
|---|---|---|
| 6,881,077 B2 | 4/2005 | Thorum |
| 7,050,305 B2 | 5/2006 | Thorum |
| 7,265,984 B2 | 9/2007 | Numata |
| 7,362,578 B2 | 4/2008 | Hornung |
| 7,839,630 B2 | 11/2010 | Hwang et al. |
| 7,961,471 B2 | 6/2011 | Odanaka et al. |
| 8,245,158 B1* | 8/2012 | Schrick ............... G06F 1/1626 715/710 |
| 8,278,880 B2 | 10/2012 | Nakajima et al. |
| 8,545,322 B2* | 10/2013 | George et al. ................. 463/37 |
| 8,902,588 B2 | 12/2014 | Ritter et al. |
| 9,007,773 B2 | 4/2015 | Warren et al. |
| 9,043,725 B2 | 5/2015 | Wakefield et al. |
| 2002/0007487 A1 | 1/2002 | Matsumoto et al. |
| 2003/0169231 A1* | 9/2003 | Rekimoto .................... 345/156 |
| 2005/0066370 A1* | 3/2005 | Alvarado et al. ............. 725/80 |
| 2006/0181859 A1 | 8/2006 | Thorum |
| 2007/0129046 A1* | 6/2007 | Soh et al. ..................... 455/403 |
| 2007/0236474 A1* | 10/2007 | Ramstein ............... G06F 3/016 345/173 |
| 2007/0285284 A1* | 12/2007 | Matteo et al. .................. 341/22 |
| 2009/0002218 A1* | 1/2009 | Rigazio et al. ............... 341/176 |
| 2009/0106655 A1* | 4/2009 | Grant .................... G06F 1/3231 715/702 |
| 2009/0165073 A1* | 6/2009 | Stallings ...................... 725/131 |
| 2009/0167694 A1* | 7/2009 | Tan ...................... G06F 1/1613 345/168 |
| 2009/0167704 A1* | 7/2009 | Terlizzi et al. ............... 345/173 |
| 2009/0169070 A1* | 7/2009 | Fadell .......................... 382/124 |
| 2009/0213066 A1 | 8/2009 | Hardacker et al. |
| 2010/0231541 A1* | 9/2010 | Cruz-Hernandez ... G06F 3/0488 345/173 |
| 2011/0001697 A1* | 1/2011 | Mao ............................. 345/157 |
| 2011/0084867 A1 | 4/2011 | Friedlander |
| 2011/0205710 A1 | 8/2011 | Kondo et al. |
| 2011/0206239 A1* | 8/2011 | Wada et al. .................. 382/103 |
| 2012/0243166 A1 | 9/2012 | Burton et al. |
| 2012/0249474 A1* | 10/2012 | Pratt .................... G06F 1/1694 345/174 |
| 2012/0327025 A1* | 12/2012 | Huska .................... G06F 3/016 345/174 |
| 2013/0063895 A1 | 3/2013 | Ritter et al. |

FOREIGN PATENT DOCUMENTS

| | | |
|---|---|---|
| CN | 101828380 | 9/2010 |
| CN | 101859488 | 10/2010 |
| EP | 0399763 B1 | 3/1997 |
| EP | 1511314 A1 | 3/2005 |
| JP | H07-86471 | 3/1995 |
| JP | 199865385 | 3/1998 |
| JP | 2000-269671 | 9/2000 |
| JP | 200122506 | 1/2001 |
| JP | 2001352497 | 12/2001 |
| JP | 2002247670 | 8/2002 |
| JP | 200370082 | 3/2003 |
| JP | 2005-005424 | 1/2005 |
| JP | 2005-078642 | 3/2005 |
| JP | 2008-131512 | 6/2008 |

* cited by examiner

REMOTE CONTROL WITH FEEDBACK FOR BLIND NAVIGATION

This application claims the benefit, under 35 U.S.C. §365 of International Application PCT/US2011/056836, filed Oct. 19, 2011, which was published in accordance with PCT Article 21(2) on Apr. 25. 2013, in English.

BACKGROUND

Current television remote controls employ the use of labeled buttons and/or screen displays to inform the user of corresponding control functions. This requires the user to look down at the remote device. Other remote control designs incorporate different button shapes or "feels" or adjust spacing between buttons to allow the user to differentiate buttons without looking at the remote. The disadvantage to this approach is that the button functions may still have to be memorized especially when the functions are used relatively infrequently.

SUMMARY

Haptic or tactile feedback in combination with on-screen display elements is utilized in a remote control device to eliminate the need for shifting focus away from a viewing device. A user is provided with an indication of a button's functionality on a viewing device before the button is actually selected. The user receives haptic/tactile feedback to let the user know that they are about to select a button and that its functionality indicator is shown on the viewing device. In this manner the user keeps their eyes focused on the viewing device, never needing to look down at the remote control device to control the viewing experience.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

Figure 1:
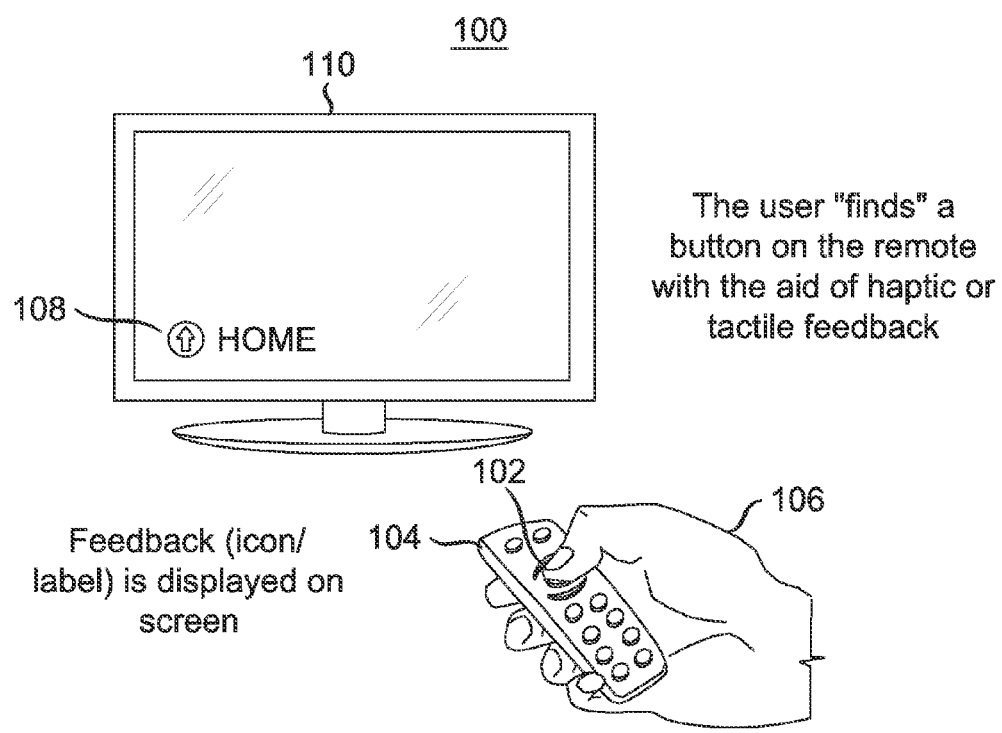
FIG. 1 illustrates an example remote control system using a remote control device that is populated with capacitive-touch buttons.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

As used in this application, the term "component" is intended to refer to hardware, software, or a combination of hardware and software in execution. For example, a component can be, but is not limited to being, a process running on a processor, a processor, an object, an executable, and/or a microchip and the like. By way of illustration, both an application running on a processor and the processor can be a component. One or more components can reside within a process and a component can be localized on one system and/or distributed between two or more systems. Functions of the various components shown in the figures can be provided through the use of dedicated hardware as well as hardware capable of executing software in association with appropriate software.

When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting instances and embodiments of the invention are intended to encompass both structural and functional equivalents. Additionally, it is intended that such equivalents include both currently known equivalents as well as equivalents developed in the future (i.e., any elements developed that perform the same function, regardless of structure).

Haptic or tactile feedback on a remote control device allows a user to concentrate on what they are viewing rather than a control device. The remote control device can include, but is not limited to, traditional dedicated remote controls, mobile devices such as cell phones, and/or mobile tablets/computers and the like. Haptics allow a user to receive sensory information, such as for example, a buzzing sensation in the fingertips, etc. Similarly, it could include hot and/or cold sensations via the fingertips as well. Induced pain sensations and other sensations could also be used by one skilled in the art to promote feedback sensations to the user. A remote control device can provide a smooth surface with haptic type "buzz" feedback as the button area is touched. That is, the button gives a sensory type of feedback to the user before it is selected. Alternatively, a remote control device can provide physical buttons, indentations or other variations in the surface to facilitate in physically locate button areas.

In one example 100 illustrated in FIG. 1, a surface 102 of a remote control device 104 is populated with capacitive-touch buttons. This allows a user 106 to be able to touch the buttons to find them and then use a separate "click" action to activate them. The haptic feedback can occur twice in this sequence: once for an initial touch and then once for a selection "click." The initial touch, like a soft buzz or mild click for example, can be used to find the button by feel (i.e., sensory feedback). This only indicates to the user 106 that the button has been found but not actuated. When the button is pressed, the select action results in a distinctive "click" and then the action is taken.

An on-screen icon/text indicator 108 can be displayed on a content viewing device 110 as a button is "hovered" over by the user 106. As buttons (haptic or tactile) are touched the remote control system provides an icon and/or text indicator 108 related to the function of the button currently touched. This allows the user to find button functions without shifting focus off of the viewing device 110. The touch function is distinct from a "select" function. Once a button is discovered by the above steps, the user 106 can select the current option by pressing or selecting. A distinct haptic feedback or click can, for example, indicate a selection.

Figure 2:
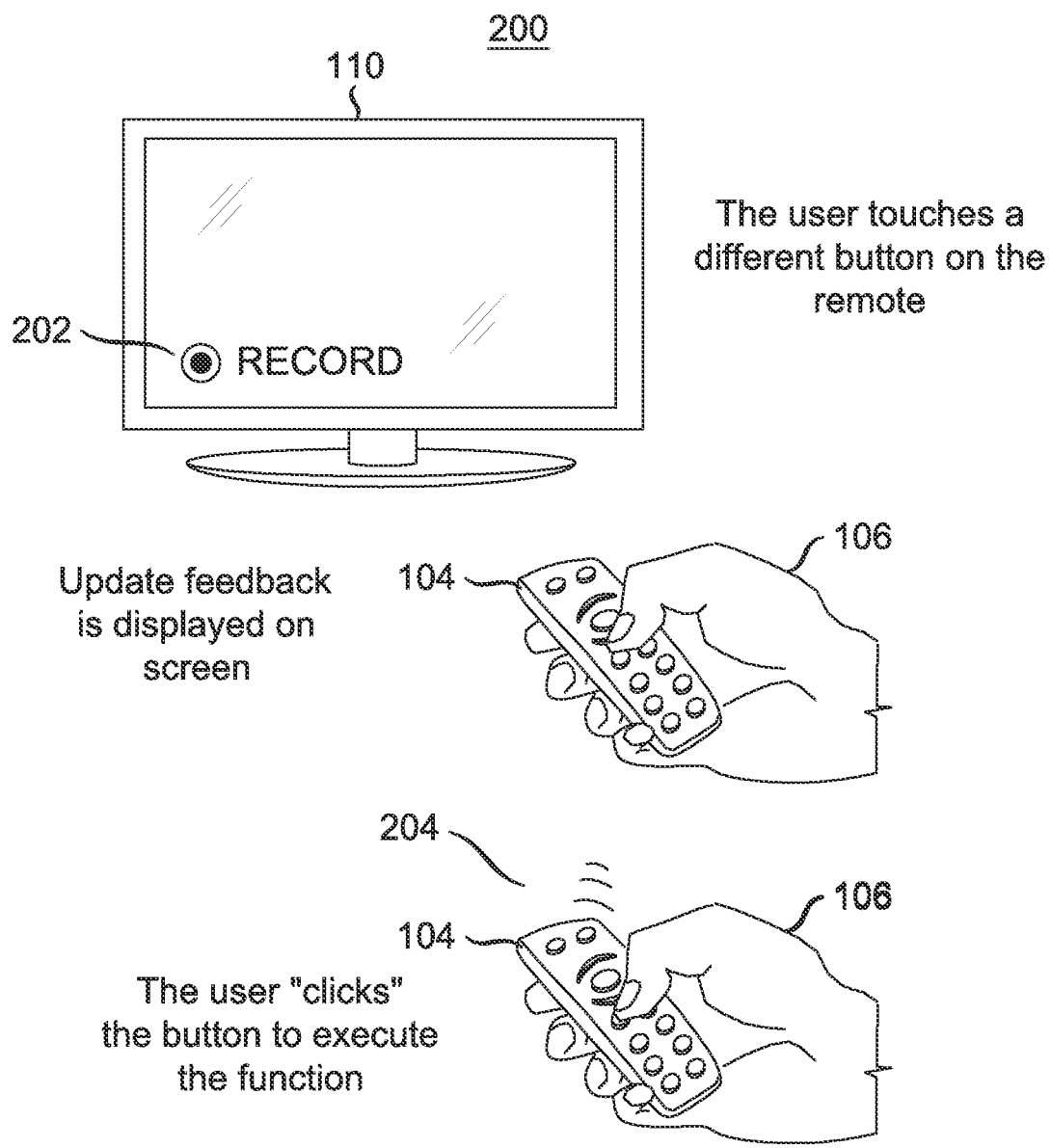
FIG. 2 illustrates an example where a user has switched from hovering over/touching a button for a "home" button to hovering over/touching a "record" button.

FIG. 2 illustrates an example 200 where the user 106 has switched from hovering over/touching a button for a "home" button (and its on-screen indicator 108) to hovering over/touching a "record" button with its on-screen indicator 202. The user, who desires to record a program, then clicks or presses downward, etc. 204 on the remote control device 104 to execute the function indicated on the viewing device 110. In this manner, the user 106 can maintain visual contact with the viewing device 110 and does not need to divert their attention to the remote control device 104 for either 1) determining which button they are about to select and 2) determining if they have successfully selected the button's functionality.

Figure 3:
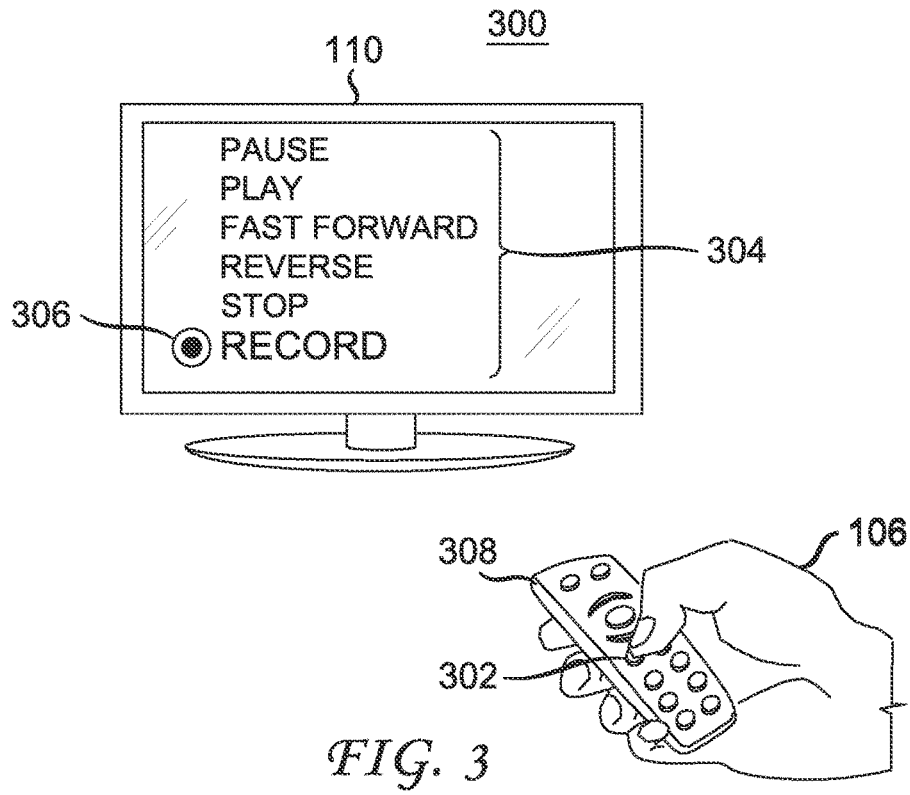
FIG. 3 shows an example of selecting functionality of a remote control device having a programmable button.

Oftentimes, a remote control device 308 can have programmable buttons. The on-screen aspect of this system can be used to configure programmable buttons as well. FIG. 3 shows an example 300 of selecting functionality of a programmable button 302. In the case of an unprogrammed button, an on-screen assistant on the viewing device 110 provides a menu of functions 304 to choose from. The user can then select a function 306, and the button is then configured to execute that function 306 on subsequent presses. To reconfigure the button, it can be pressed and held to bring up the options once again.

Figure 4:
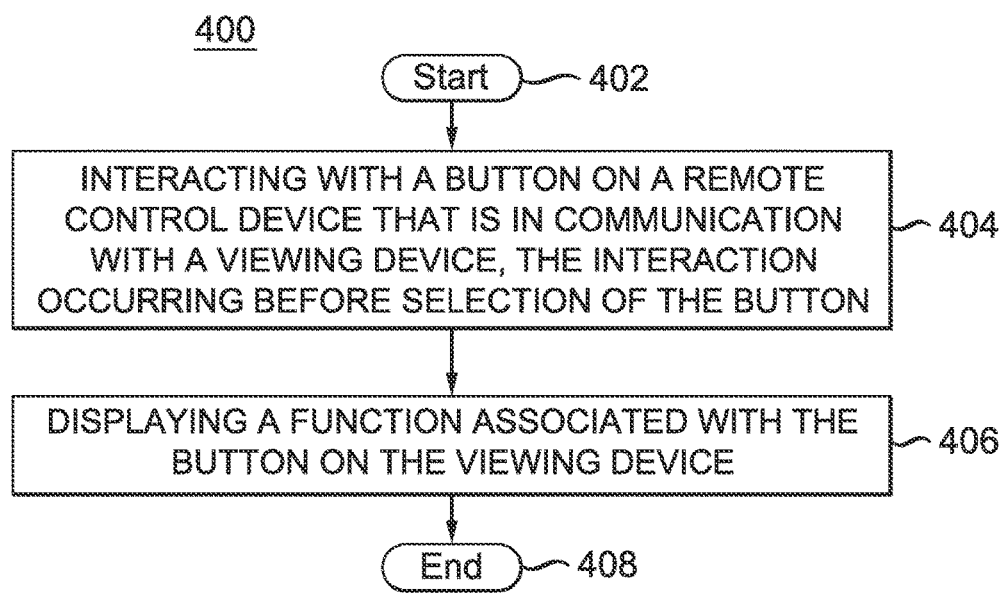
FIG. 4 is a flow diagram of a method of controlling a viewing experience with a remote control device that employs feedback prior to a button selection.

In view of the exemplary embodiments shown and described above, methodologies that can be implemented in accordance with the embodiments will be better appreciated with reference to the flow charts of FIG. 4. While, for purposes of simplicity of explanation, the methodologies are shown and described as a series of blocks, it is to be understood and appreciated that the embodiments are not limited by the order of the blocks, as some blocks can, in accordance with an embodiment, occur in different orders and/or concurrently with other blocks from that shown and described herein. Moreover, not all illustrated blocks may be required to implement the methodologies in accordance with the embodiments.

FIG. 4 is a flow diagram of a method 400 of controlling a viewing experience. The method starts 402 by interacting with a button on a remote control device that is in communication with a viewing device, the interaction occurring before selection of the button 404. The interaction can include, but is not limited to, a user hovering over the button and/or a user lightly touching a button and the like. The interaction just needs to be such that the user knows which button they are in proximity with without invoking the function of the button. This can include some type of haptic feedback and/or other tactile feedback such as a button shape, depression, etc. A function associated with the button is then displayed on the viewing device 406, ending the flow 408. In another instance, haptic feedback can also be provided to the user when the button function is selected. This type of haptic feedback can be of another type than the feedback provided for interacting with the button. If the feedback types are different, the user can easily determine if the function has been selected or not.

In yet another example, the above method can be extended for unprogrammed buttons on a remote control device. In this scenario, a list of functionality indicators (e.g., text, icons, etc.) is displayed on a viewing device when a button is being interacted with but has not been previously programmed. The list could, for example, include such functions as STOP, PLAY, REVERSE, FAST FORWARD, PAUSE, VOLUME UP, VOLUME DOWN, CHANNEL UP, CHANNEL DOWN and the like. The methods disclosed herein applied to any type of functionality. The functionality can then be selected via the remote control device or some other means. This programs the button to that functionality.

In other words, the above techniques can be applied as the user moves and touches buttons to cause an indicator to show up on a viewing device, the indicator denoting the assigned function of the remote control device's button. Thus, icons and/or textual prompts are displayed on the viewing device as buttons are touched on the remote control device. This allows the user to "see" the button labels on the viewing device as they touch specific button areas on the remote. The button action is not executed until the user clicks the button. If the button is not currently programmed, the user is able to assign a function at that time.

The remote can be constructed such that there is a single button with an internal processor that detects the particular area that has been touched to discriminate between buttons. As the user touches button areas, a distinct vibration can be created allowing the user to sense when their finger is in position. When the user presses the button, a different "click" is offered as feedback. Physical dimples or bumps in the remote's surface can substitute for the touch feedback and a physical switch for the "select" feedback. This allows the user to detect where they are on the remote control device by feel. By employing haptic touch to "feel" the buttons along with on-screen assist, allows the user to maintain focus on the viewing device without shifting attention to the remote control device itself.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A control device that controls a viewing experience, the control device comprising:
   at least one button and a plurality of interaction modes for interacting with the at least one button, the plurality of interaction modes including a select mode and a proximity mode, the control device is configured to:
   initiate a display of at least one on-screen indicator on a viewing device, when the proximity mode is detected via a button on the control device, wherein the at least one on-screen indicator represents a function associated with the button;
generate a first haptic feedback, when the proximity mode is detected via the button; and
generate a second haptic feedback different from the first haptic feedback and execute the function associated with the button, when activation of the button is detected;
wherein when a given button is programmable and not configured, and the proximity mode or select mode of the given button has been activated, the control device is further configured to display on the viewing device one or more possible functions of the given button in a programmed state.

2. The control device of claim 1, wherein detection of the proximity mode includes detection of a hovering over the button or a touch of the button without depressing the button.

3. The control device of claim 1, wherein the at least one on-screen indicator on the viewing device indicates one or more functions for controlling the viewing experience, the one or more functions being associated with the button of the control device.

4. A method for controlling a viewing experience with a control device having at least one button, which comprises a plurality of interaction modes for interacting with the at least one button, including a select mode and a proximity mode, the method comprising:
initiating, by the control device, a display of at least one on-screen indicator on a viewing device when the proximity mode of a button on the control device is detected, wherein the at least one on-screen indicator represents a function associated with the button;
generating, by the control device, a first haptic feedback, when the proximity mode is detected via the button;
generating, by the control device, a second haptic feedback different from the first haptic feedback, when activation of the button is detected;
executing, by the control device, the function associated with the button, when activation of the button is detected; and
displaying on the viewing device one or more possible functions of a given button in a programmed state, when the given button is programmable and not configured, and the proximity mode or select mode of the given button has been activated.

5. A system that controls a viewing experience, the system comprising:
a control device for selecting a function associated with controlling the viewing experience, the control device having at least one button and a plurality of interaction modes for interacting with the at least one button, the plurality of interaction modes including a select mode and a proximity mode, the control device is configured to:
initiate a display of at least one on-screen indicator on a viewing device when the proximity mode is detected via a button on the control device, wherein the at least one on-screen indicator represents a function associated with the button;
generate a first haptic feedback, when the proximity mode is detected via the button;
generate a second haptic feedback different from the first haptic feedback and execute the function associated with the button, when activation of the button is detected; and
when the proximity mode is activated and the button is programmable and not configured, display on the viewing device a list of possible functionality indicators of the button, wherein the proximity mode is activated without depressing the button.

6. The system of claim 5, wherein the control device initiates the on-screen indicator on the viewing device and the haptic feedback when hovering is detected over the button.

7. The control device of claim 1, wherein the viewing device is configured to display, when the proximity mode has been detected, the at least one on-screen indicator associated with the button on the control device.

8. The system of claim 5, wherein a hovering input initiates the proximity mode, the at least one on-screen indicator providing feedback to indicate a function of a plurality of functions for controlling the viewing experience without depressing the button, and wherein the select mode executes the function associated with the controlling of the viewing experience.

9. The method of claim 4, further comprising detecting a hovering over the button or a touch of the button without depressing the button.

10. The method of claim 4, wherein the at least one on-screen indicator on the viewing device indicates one or more functions for controlling the viewing experience, the one or more functions being associated with button of the control device.

* * * * *